(12) United States Patent
Tang et al.

(10) Patent No.: US 7,876,770 B1
(45) Date of Patent: *Jan. 25, 2011

(54) CLEAR CHANNEL ASSESSMENT IN WIRELESS COMMUNICATIONS

(75) Inventors: Hsiao-Cheng Tang, San Jose, CA (US);
Yungping Hsu, Cupertino, CA (US);
Guorong Hu, Sunnyvale, CA (US);
Weishi Feng, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 245 days.

This patent is subject to a terminal disclaimer.

(21) Appl. No.: 12/156,080

(22) Filed: May 29, 2008

Related U.S. Application Data

(63) Continuation of application No. 10/268,156, filed on Oct. 9, 2002, now Pat. No. 7,403,539.

(51) Int. Cl.
*H04L 12/413* (2006.01)

(52) U.S. Cl. .............. 370/445; 370/431; 370/338; 370/441; 370/447; 370/462; 455/234.1; 455/423

(58) Field of Classification Search .............. 370/338, 370/431, 441, 445, 447, 462; 455/234.1, 455/423

See application file for complete search history.

(56) References Cited

U.S. PATENT DOCUMENTS

| | | | | |
|---|---|---|---|---|
| 5,909,462 A * | 6/1999 | Kamerman et al. | ......... | 375/147 |
| 6,067,291 A * | 5/2000 | Kamerman et al. | ......... | 370/338 |
| 6,469,997 B1 | 10/2002 | Dorenbosch et al. | | |
| 6,539,028 B1 * | 3/2003 | Soh et al. | ..................... | 370/445 |
| 6,675,012 B2 * | 1/2004 | Gray | .......................... | 455/423 |
| 6,834,045 B1 | 12/2004 | Lappetelainen et al. | | |

(Continued)

FOREIGN PATENT DOCUMENTS

EP 1124337 A2 8/2001

OTHER PUBLICATIONS

IEEE Std 802.11a-1999 (Supplement to IEEE Std 802.11-1999) [Adopted by ISO/IEC and redesignated as ISO/IEC 8802-11: 1999/ Amd 1:2000(E)]; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

(Continued)

*Primary Examiner*—Pankaj Kumar
*Assistant Examiner*—Gautam Sharma

(57) ABSTRACT

Techniques for and apparatus capable of implementing packet detection and signal recognition in wireless communications systems are disclosed. In particular, the disclosed techniques and apparatus incorporate at least one of relative energy detection operable on assessment of a relative energy threshold for an inbound signal borne across an RF channel, carrier sense operable upon on assessment of at least one of a peak-to-sidelobe ratio and peak-to-peak distance defined by the inbound signal, and comparison operable upon demodulated data corresponding to the inbound signal as compared to predetermined preamble data. Clear channel assessment is performed based on determinations undertaken by one or more of the aforementioned relative energy detection, carrier sense and comparison operations.

25 Claims, 7 Drawing Sheets

U.S. PATENT DOCUMENTS

| | | | | |
|---|---|---|---|---|
| 6,898,204 | B2* | 5/2005 | Trachewsky et al. | 370/445 |
| 6,970,682 | B2* | 11/2005 | Crilly, Jr. et al. | 455/78 |
| 7,061,877 | B1* | 6/2006 | Gummalla et al. | 370/278 |
| 7,620,063 | B2* | 11/2009 | Cave et al. | 370/445 |
| 2002/0061738 | A1* | 5/2002 | Simmons et al. | 455/234.1 |
| 2003/0021365 | A1* | 1/2003 | Min et al. | 375/343 |
| 2003/0026198 | A1* | 2/2003 | Diepstraten et al. | 370/208 |
| 2004/0042534 | A1* | 3/2004 | Raphaeli et al. | 375/150 |

OTHER PUBLICATIONS

IEEE P802.11g/D8.2, Apr. 2003 (Supplement to ANSI/IEEE Std 802.11-1999(Reaff 2003)); Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

IEEE Std 802.16a-2003 (Amendment to IEEE Std 802.16-2001), IEEE Standard for Local and metropolitan area networks; Part 16: Air Interface for Fixed Broadband Wireless Access Systems—Amendment 2: Medium Access Control Modifications and Additional Physical Layer Specifications for 2-11 GHz; IEEE Computer Society and the IEEE Microwave Theory and Techniquest Society; Apr. 1, 2003; 318 pages.

IEEE Std. 802.11b-1999; Sponsor LAN/MAN Standards Committee of IEEE Computer Society, "Part 11: Wireless LAN Medium Access Control (MAC) and Physical Layer (PHY) Specifications, Higher-Speed Phycisal Layer Extension in 2.4 GHz Band"; Sep. 1999; pp. 1-89.

International Standard, ANSI/IEEE std. 802.11, first edition, Sponsor LAN/MAN Standards Committee of IEEE Computer Society, "Part 11: Wireless LAN Medium Access Control (MAC) and Physical Layer (PHY) specifications"; 1999.

Geir, Jim, "Wireless LANs, Second Edition", Sams Publishing; 2000; pp. 137-151.

IEEE Standards 802.16, Local and metropolitan area networks; Part 16: Interface for Fixed Broadband Wireless Access Systems; Oct. 1, 2004; 893 pages.

* cited by examiner

CLEAR CHANNEL ASSESSMENT IN WIRELESS COMMUNICATIONS

CROSS REFERENCE TO RELATED APPLICATIONS

This application is a continuation of U.S. patent application Ser. No. 10/268,156, filed Oct. 9, 2002. The disclosure of the above application is incorporated herein by reference in its entirety.

TECHNICAL FIELD

The present invention generally relates to wireless communications, and is specifically concerned with clear channel assessment techniques to determine the presence or absence of a valid inbound signal.

BACKGROUND OF THE INVENTION

The past few years has witnessed the ever-increasing availability of relatively cheap, low power wireless data communication services, networks and devices, promising near wire speed transmission and reliability. One technology in particular, described in the IEEE Standard 802.11b-1999 Supplement to the ANSI/IEEE Standard 802.11, 1999 edition, collectively incorporated herein fully by reference, and more commonly referred to as "802.11b" or "WiFi", has become the darling of the information technology industry and computer enthusiasts alike as a wired LAN/WAN alternative because of its potential 11 Mbps effective throughput, ease of installation and use, and transceiver component costs make it a real and convenient alternative to wired 10 BaseT Ethernet and other cabled data networking alternatives. With 802.11b, workgroup-sized networks can now be deployed in a building in minutes, a campus in days instead of weeks since the demanding task of pulling cable and wiring existing structures is eliminated. Moreover, 802.11b compliant wireless networking equipment is backwards compatible with the earlier 802.11 1 M/2 Mbps throughput standard, thereby further reducing deployment costs in legacy wireless systems.

802.11b achieves relatively high payload data transmission rates or effective throughput via the use of orthogonal class modulation in general, and, more particularly, 8-chip complementary code keying ("CCK") and a 11 MHz chipping rate to bear the payload. As such, previously whitened or scrambled bitstream data of interest is mapped into nearly orthogonal sequences (or CCK code symbols) to be transmitted, where each chip of the CCK code symbol is quaternary phase modulated using QPSK ("quadrature phase shift keying") modulation techniques. Meanwhile the common phase of each CCK symbol is jointly determined by the current and previous symbols using differential QPSK or DQPSK modulation scheme. Subsequent conversion into the analog domain prepares these CCK symbols for delivery over a wireless medium RF modulated on a carrier frequency within the internationally recognized 2.4 GHz ISM band to form the payload or PLCP Service Data Unit of an 802.11b compliant Physical Layer Convergence Procedure ("PLCP") frame, a type of packet. The high-rate physical layer PLCP preamble and header portions forming the frame overhead are still modulated using the 802.11 compliant Barker spreading sequence at an 11 MHz chipping rate. In particular, the preamble (long format—144 bits, short format—72 bits) is universally modulated using DBPSK ("differential binary phase shift keying") modulation resulting in a 1 Mbps effective throughput, while the header portion may be modulated using either DBPSK (long preamble format) or DQPSK (short preamble format) to achieve a 2 Mbps effective throughput.

An IEEE 802.11b compliant receiver receives and downconverts an incident inbound RF signal to recover an analog baseband signal bearing the PLCP frame, and then digitizes and despreads this signal to recover the constituent PLCP preamble, header and payload portions in sequence. The preamble and header portions are Barker correlated and then either DBPSK or DQPSK demodulated based on the preamble format used to recover synchronization data and definitional information concerning the received PLCP frame, including the data rate (Signal field in the PLCP header) and octet length (Length field in the PLCP header) of the variable-length payload or PSDU portion. The CCK encoded symbols forming the PLCP payload portion are each correlated against 64 candidate waveforms in received per symbol sequence in combination with DQPSK demodulation to verify and reverse map each into the underlying bitstream data of interest, at either 4 bits per symbol (5.5 Mbps) or 8 bits per symbol (11 Mbps) increments.

It should be appreciated that 802.11 and 802.11b signals operate in the 2.4 GHz ISM band and must therefore coexist with quite an array of dissimilar signals operating in the same frequency, including microwave ovens and digital phones. By definition, there are no licensure restrictions within the available RF channels of the ISM band, so 802.11 and 802.11b compliant transceivers must employ clear channel assessment techniques to determine if it is safe to transmit. In particular, there is an expected amount of ambient noise that the 802.11/802.11b transceivers must tolerate but still be able to transmit, but should not attempt to transmit while another in-range 802.11/802.11b transceiver is transmitting so as to maximize channel use and system throughput. In other words, it is desirable for 802.11 and 802.11b transceivers to know when the operating channel is occupied with valid traffic, and thus enter receive mode without attempting to transmit over such traffic. Likewise, it is desirable that these transceivers should be free to transmit on the operating channel while that channel is free of 802.11/802.11b traffic, even in the presence of a tolerable amount of noise or interference.

To this end, the 802.11 and 802.11b standards specify clear channel assessment (CCA) guidelines which are used to determine if a tuned RF channel contains valid PLCP frame traffic. Inbound signals in the tuned or operating RF channel which do not meet these CCA guidelines are considered to bear either corrupted frames, or represent interference or noise in the channel. The 802.11/802.11b CCA guidelines are organized in modes as follows:

- CCA Mode 1: Energy above threshold. CCA shall report a busy medium upon detecting any received energy above the ED threshold.
- CCA Mode 2: Carrier Sense only. CCA shall report a busy medium only upon detection of a DSSS signal. This signal may be above or below the ED threshold.
- CCA Mode 3: Carrier Sense with energy above threshold. CCA shall report a busy medium upon detection of a DSSS signal with energy above the ED threshold.
- CCA Mode 4 (802.11b): Carrier sense with timer. CCA shall start a timer whose duration is 3.65 ms and report a busy medium upon the detection of a High Rate PHY signal. CCA shall report an IDLE medium after the timer expires and no High Rate PHY signal is detected. The 3.65 ms timeout is the duration of the longest possible 5.5 Mbps PSDU.
- CCA Mode 5 (802.11b): A combination of carrier sense and energy above threshold. CCA shall report busy at least while a High Rate PPDU with energy above the ED threshold is being received at the antenna.

The 802.11 DSSS PHY receiver must perform CCA according to at least one of modes 1-3, and the 802.11b High Rate PHY must perform CCA according to modes 1, 4 or 5.

Three of the five conventional CCA modes require thresholding inbound signal energy, and so this guideline is believed important. However, conventional transceivers simply compare inbound signal energy against the specified threshold, and report an energy threshold validation signal whenever the threshold is exceeded. Thus, the presence of strong interference in the operating channel, will cause (in the case of a CCA mode 1 implementation) or potentially may (in the case of a CCA mode 3 or 5) cause a false busy to be reported, and thus prevent the transceiver from transmitting, which may in turn cause transmission delay and lower effective data throughput.

Moreover, to implement CCA modes 2-5, conventional CCA carrier sense techniques are used to determine if a DSSS or High Rate PHY inbound signal is present, typically by thresholding a measure of the perceived Barker code lock. However, known techniques are relatively complex and are thus power inefficient and expensive to implement. Both cost and power consumption reduction are critical design goals in 802.11/802.11b transceiver implementation, it would be advantageous if simpler carrier sense techniques could be incorporated without materially affecting carrier sense sensitivity or recognition performance.

Further, while conventional CCA techniques look for valid PLCP header information (via CRC validation), there is no post-demodulation confirmation during receipt of the preamble. Checking for valid preamble receipt would be advantageous, especially where the inbound signal fades potentially below the inbound signal energy threshold, but the receiver is still able to successfully recover recognizable preamble information from the signal.

Finally, while the defined 802.11/802.11b CCA modes account accommodate a range of operational environments, they are not appropriate for every environment and channel condition. Therefore, it would advantageous to provide a transceiver capable of handling further CCA modes other than those defined by the 802.11/802.11b standards, preferably while retaining backwards compatibility with such standards.

SUMMARY OF THE INVENTION

To address these and other perceived shortcomings and desires, the present invention is directed in part to a packet detection unit and signal recognition method that includes at least one of relative energy detection operable on assessment of a relative energy threshold for an inbound signal borne across an RF channel, carrier sense operable upon on assessment of at least one of a peak-to-sidelobe ratio and peak-to-peak distance defined by the inbound signal, and comparison operable upon demodulated data corresponding to the inbound signal as compared to predetermined preamble data. Clear channel assessment is performed based on determinations undertaken by one or more of the aforementioned relative energy detection, carrier sense and comparison operations.

Further aspects of the present invention include a tranceiver, network interface apparatus, and information processor incorporating this packet detection unit, as well as a computer program product including computer readable program code capable of causing an information processor to perform one or more of these signal recognition aspects.

Additional aspects and advantages of this invention will be apparent from the following detailed description of certain embodiments thereof, which proceeds with reference to the accompanying drawings.

DETAILED DESCRIPTION OF THE EMBODIMENTS

Figure 1:
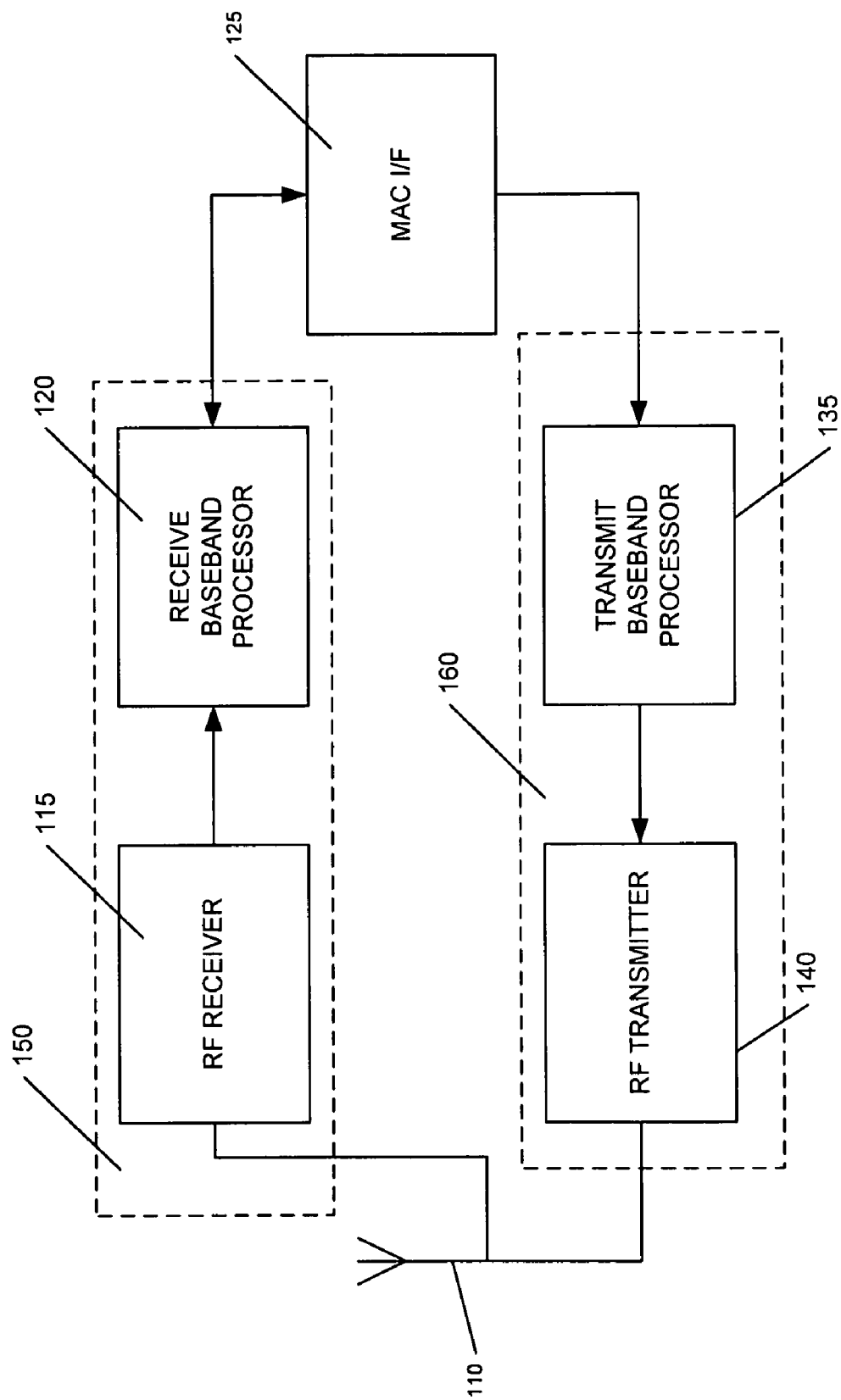
FIG. 1 is a high level block diagram of a wireless transceiver in accordance with an embodiment of the invention.

Turning now to the figures, FIG. 1 illustrates a wireless communications transceiver 100 according to an embodiment of the invention. In this embodiment, inbound RF signals potentially conveying an 802.11 or 802.11b compliant PLCP frame are picked up by the duplex antenna 110 and routed to the RF receiver unit 115 of a receiver 150 arranged in a manner consistent with the present invention. The RF receiver unit 115 performs routine downconversion and automatic gain control of the inbound RF signals, and presents an analog baseband signal containing the aforementioned 802.11b PLCP frame to the receive baseband processor 120. The functions of the receive baseband processor 120 will be detailed below with reference to FIG. 2, including packet detection and channel busy consistent with the present invention, along with conventional symbol correlation and/or demodulation of the preamble, header and payload portions of each inbound 802.11b PLCP frame to recover bitstream data for receiver synchronization (preamble), frame or packet definition (header), or the actual inbound data of interest (payload).

Once recovered by the receive baseband processor 120, the inbound data contained in the PSDU of each received 802.11b PLCP frame is delivered to a network interface such as the MAC layer interface 125 and then on to higher layer applications and devices being serviced by the transceiver 100.

Outbound data intended for wireless transmission originating from the device(s) or application(s) being serviced by the transceiver 100 are delivered to the transmit baseband processor 135 of the transmitter 160 from the MAC interface 125. Directives from the PMD sublayer (not shown) forming part of the MAC interface 125 and expressing the desired transmission mode, including the 802.11b 1, 2, 5.5 and 11 Mbps effective throughput modes are transferred to the transmit baseband processor as well for each PLCP frame/packet. The transmit baseband processor 135 formulates appropriate 802.11b PLCP frame, and symbol encodes the outbound data as specified by the PMD sublayer to generate a complete outbound 802.11b PLCP frame. As the frame or packet is being developed, it is converted into analog form suitable for upconversion and RF transmission by the RF transmitter unit 140 consistent with 802.11b physical layer requirements.

Though not shown in FIG. 1, the transceiver 100 may form an operational part of a network interface apparatus such as a PC card or network interface card capable of interfacing with the CPU or information processor of an information processing apparatus such as a desktop or laptop computer, and may be integrated within and constitute a part of such information processing apparatus. This network interface apparatus may alternatively form an operational component of a wireless communications access point such as a base station as will be appreciated by these ordinarily skilled in the art.

Figure 2:
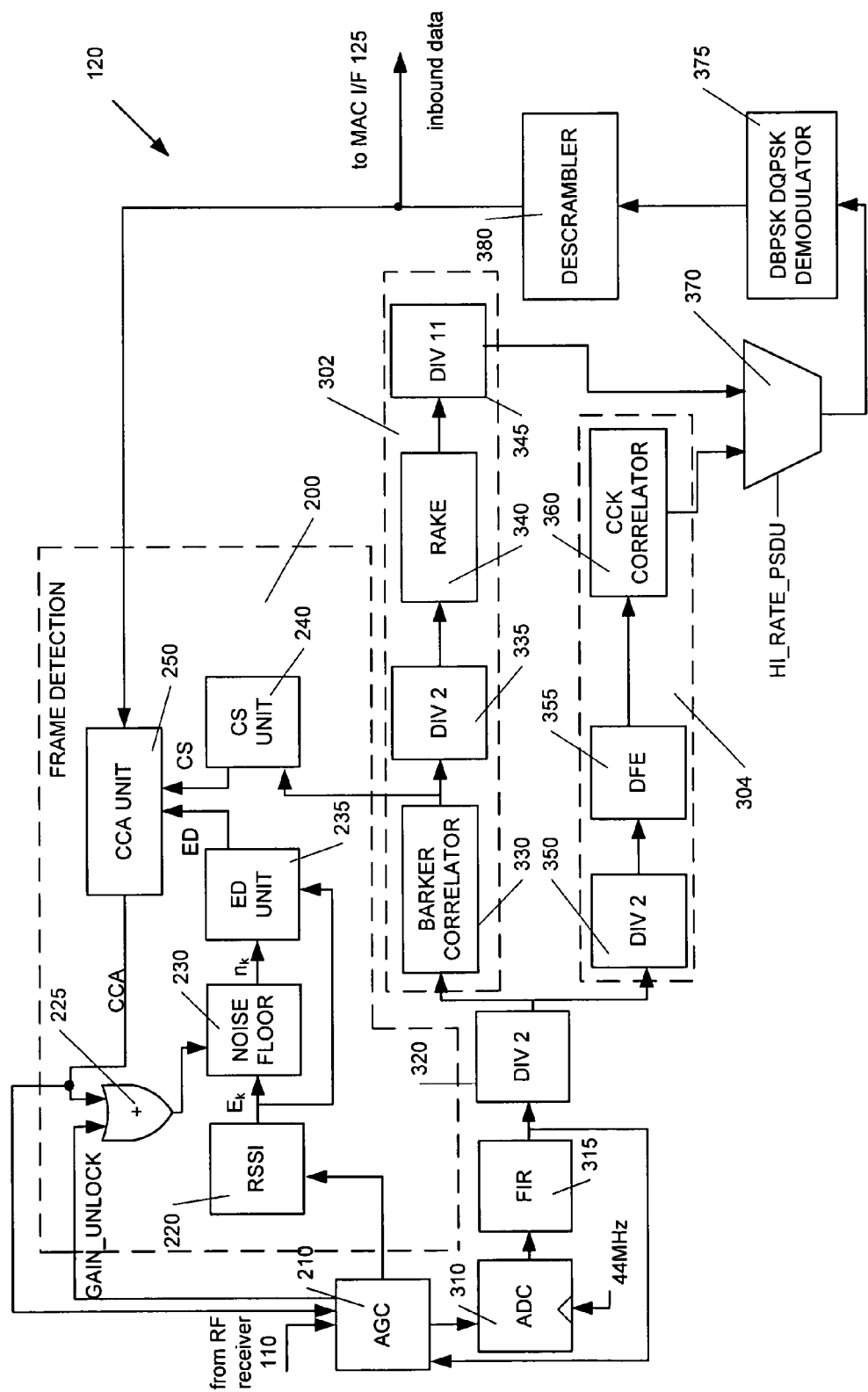
FIG. 2 is a more detailed block diagram of a receive baseband processing unit shown in FIG. 1.

Turning now to FIG. 2, FIG. 2 is a more detailed block diagram of the receive baseband processor 120 shown in FIG. 1. So as not to obfuscate the teachings of the present invention, several 802.11 and 802.11b compliant directives and signals are not shown. As such, an inbound analog baseband signal potentially conveying an inbound 802.11/802.11b PLCP frame recovered by the RF receiver unit 110 of the receiver 150 is fed to the input of the automatic gain control unit (AGC) 210. With the assistance of a feedback loop tied to the input of the FIR filter 315, the AGC 210 adjusts the gain of the inbound baseband signal to maximize the dynamic range and performance of the analog to digital converter 310, as is known in the art, assuming the inbound signal is valid. The AGC 210 also reports the gain adjusted signal to the RSSI unit 220 of the frame detection unit 200 for channel busy, as will be described in greater detail below.

The gain adjusted inbound analog signal generated by the AGC 210 is then sent to the digital converter 310 to convert it into digital form. With the aid of the 44 MHz clock, the ADC produces a corresponding digital signal sampled at 44 MHz. Next, this digital signal passes through the digital FIR LPF 315 to reject out-of-band interference, and the down sampler 320 to provide a 22 Mhz digital signal potentially bearing a PLCP frame of interest.

This 22 MHz signal next encounters two parallel baseband demodulation pathways. The first demodulation pathway, including the Barker correlator 330, down sampler 335, Rake 340 and the down sampler 345 is used to recover a despread 1 MHz signal representing the preamble and header portions of the inbound frame for symbol demodulation by the combination DBPSK/DQPSK demodulator 375. This first demodulation pathway-demodulator combination 375 is also used for symbol decoding a base 802.11 PLCP frame payload in 1 Mbps/2 Mbps modes. The second demodulation pathway is used to symbol demodulate a high rate 802.11b payload portion of the inbound frame, and includes a 22 MHz to 11 MHz down sampler 350 following by a decision feedback equalizer 355. To begin the CCK symbol decode process for 802.11b compliant payloads at 11 Mbps or 5.5 Mbps transmission modes, a CCK correlator 360 is provided.

An 802.11b compliant receive state machine (not shown) issues the HI_RATE_PSDU semaphore to control the modulation pathway selection mux 370 based on which portion of the inbound frame is being demodulated, as well whether 5.5 Mbps+ payload modulation modes are specified. The combination DBPSK/DQPSK demodulator 375 is used to recover the symbol encoded inbound data presented in the preamble, header and payload portions. The DBPSK/DQPSK demodulator is clocked at the symbol rate; i.e., 1 MHz for 1 Mb and 2 Mb modes, and 1.375 MHz for 5.5 Mb and 11 Mb modes. After symbol demodulation, the recovered inbound data is descrambled by the descrambler 380 in a known fashion, and delivered to the MAC interface 125 (FIG. 1).

Still referring to FIG. 2, the frame detection unit 200 is provided to determine if the inbound baseband signal recovered from an RF channel tuned by the RF receiver 115 (FIG. 1) is a valid signal at least capable of bearing an 802.11b compliant PLCP frame, and if so, keep the transceiver 100 in receive mode for the duration of the frame.

Figure 6:
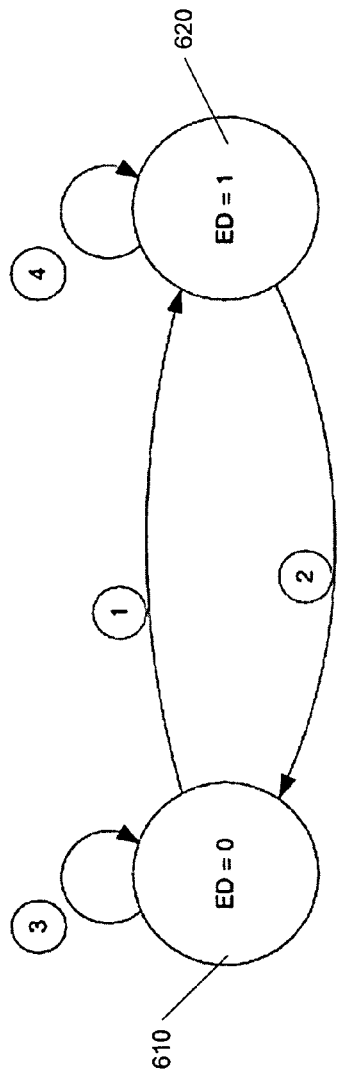
FIG. 6 is a state transition diagram for the ED unit shown in FIG. 2.
Figure 8:
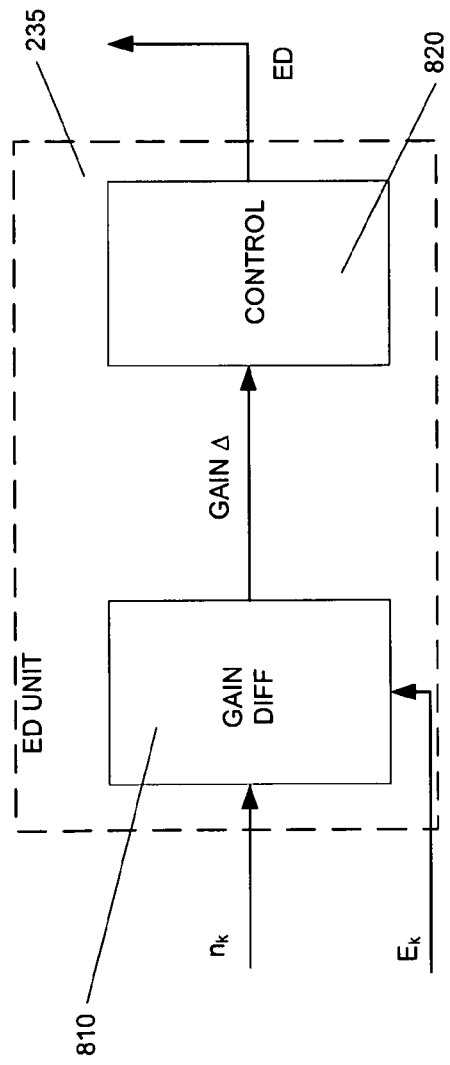
FIG. 8 is a block diagram for the ED unit shown in FIG. 2.

To implement relative energy threshold detection consistent with the invention, in the frame detection unit 200 of the embodiment shown in FIG. 2, an RSSI unit 220 is provided to receive and down sample the digital adjusted gain signal for the inbound baseband signal generated by the AGC 210 to a 2 MHz gain signal E, with $E_k$ representing the signal E at the kth 2 MHz sample in time. E is sent directly to one input of the relative energy detection unit 235, and is concurrently sent to a noise floor unit 230. The noise floor unit 230 here constitutes an IIR low pass filter to generate a 0.5 μsec delayed signal n which tracks the original signal E using the following relationship: $n_k = \alpha E_k + (1-\alpha) n_{k-1}$ The relative energy threshold detection unit 235 receives both E and n, and calculates the difference between the gain values each represents (via the gain differential unit 810 shown in FIG. 8) as a gain change over time. Through the control unit 820, the relative energy threshold detection unit 235 compares the gain change over time against one of two preferably programmable energy detection thresholds, based on the current state of the control unit 820. Though not required, the relative energy threshold detection unit 235 of the present embodiment operates on a 1 MHz synchronized clock, and so E and n are effectively downsampled at a 1 MHz rate before their difference is compared against one of these thresholds. As shown in FIG. 6, the control unit 820 functions as a finite state machine capable of switching between two states 610, 620.

Referring to FIG. 6, the control unit 820 (FIG. 8) of the energy threshold detection unit 235 (FIG. 2) is initialized to state 610 at the beginning of each frame detection processing sequence (such as when a new inbound signal is first received on the operating RF channel). As such, the energy threshold validation signal (ED) is set to false (e.g. logic level 0). While in state 610, the control unit 820 monitors the gain change over time generated by the gain differential unit 810. The control unit 820 remains in state 610 while the gain remains relatively stable (transition or trans. 3). If the gain change over time exceeds a first energy detection threshold, meaning that the gain is changing rapidly with the AGC 210 in a gain unlock condition and attempting to transition to receive mode from transmit protect mode in response to an inbound signal having relatively significant energy, the control unit 820 transitions to state 820 (trans. 2) and the energy threshold validation signal transitions to true (logic level 1). In turn, assertion of true energy threshold validation signal may cause assertion of the channel busy signal (CCA) true by the CCA unit 250, depending on the CCA mode being implemented.

The control unit 820 remains at state 620 (trans. 4) while the gain change over time continues to exceed a second energy detection threshold to hold energy threshold validation signal true. However, once the gain change over time settles and the gain stabilizes, the control unit 820 transitions back to state 610 (2), and the energy threshold validation signal transitions back to logic level 0 or false.

Note that in this embodiment the second energy detection threshold is less than the first energy detection threshold to lengthen the window in which the energy threshold validation signal is asserted high by the control unit 820. However, in alternative embodiments, the first and second thresholds may be equal or even reversed depending on particular CCA implementation goals.

Due to this "relative energy thresholding", certain gain signal transitioning rather than the receive/transmit state of the AGC 210 is used to toggle the energy threshold validation signal. This difference is subtle, yet important in handling relatively strong, persistent interference in the operating channel. In conventional absolute RSSI thresholding, the energy threshold validation signal would be held as long as the strong interference is perceived by the AGC 210 as the inbound signal, thus at least potentially causing a conventional CCA unit implementing legacy CCA modes to consider the channel to be busy for the duration of the interference and erroneously holding the transceiver in receive mode. Take, for example, the gain curves shown in FIG. 7. The left curve 710 illustrates the RSSI output E, and the conventional absolute threshold is shown as horizontal line 730. As E transitions from a relatively high value to a relatively low value over time (indicating that the AGC has unlocked and is transitioning from the high gain transmit protect state to a low gain receive state) a conventional energy threshold validation signal would transition true once E crosses the absolute threshold 730 and would remain so until the inbound signal diminishes significantly or disappears, thereby permitting E to drift upward towards high gain or receive mode.

However, in "relative energy thresholding" according to the present embodiment, the energy threshold validation signal is only held high between the point from where the difference between the n 720 and E 710 curves exceed the first energy detection threshold $T_{RED1}$ to where it no longer exceeds the second energy detection threshold $T_{RED2}$. This helps the CCA unit discriminate between interference and a valid signal and respond more quickly with an idle channel determination in the presence of such interference, especially where additional validating criteria based on the content of the inbound signal such as preamble, carrier sense and header validation is assessed.

In the embodiment shown in FIG. 2, the noise floor unit 230 is only operational (and so tracks the RSSI output E) while the channel busy signal (CCA) is false and the AGC is not in the aforementioned gain unlock state (as indicated by the GAIN_UNLOCK signal). When not operational the output of the noise floor unit 230, n is frozen to the last tracked value. For example, if the inbound energy is a valid 802.11/802.11b signal, the noise floor computation will stop upon gain unlock or CCA assertion. Thus, in this case and though not shown in FIG. 7, curve 720 representing n would remain constantly high while the inbound energy is detected. Thus, the energy threshold validation signal would hold true for the duration of the 802.11/802.11b packet.

Figure 7:
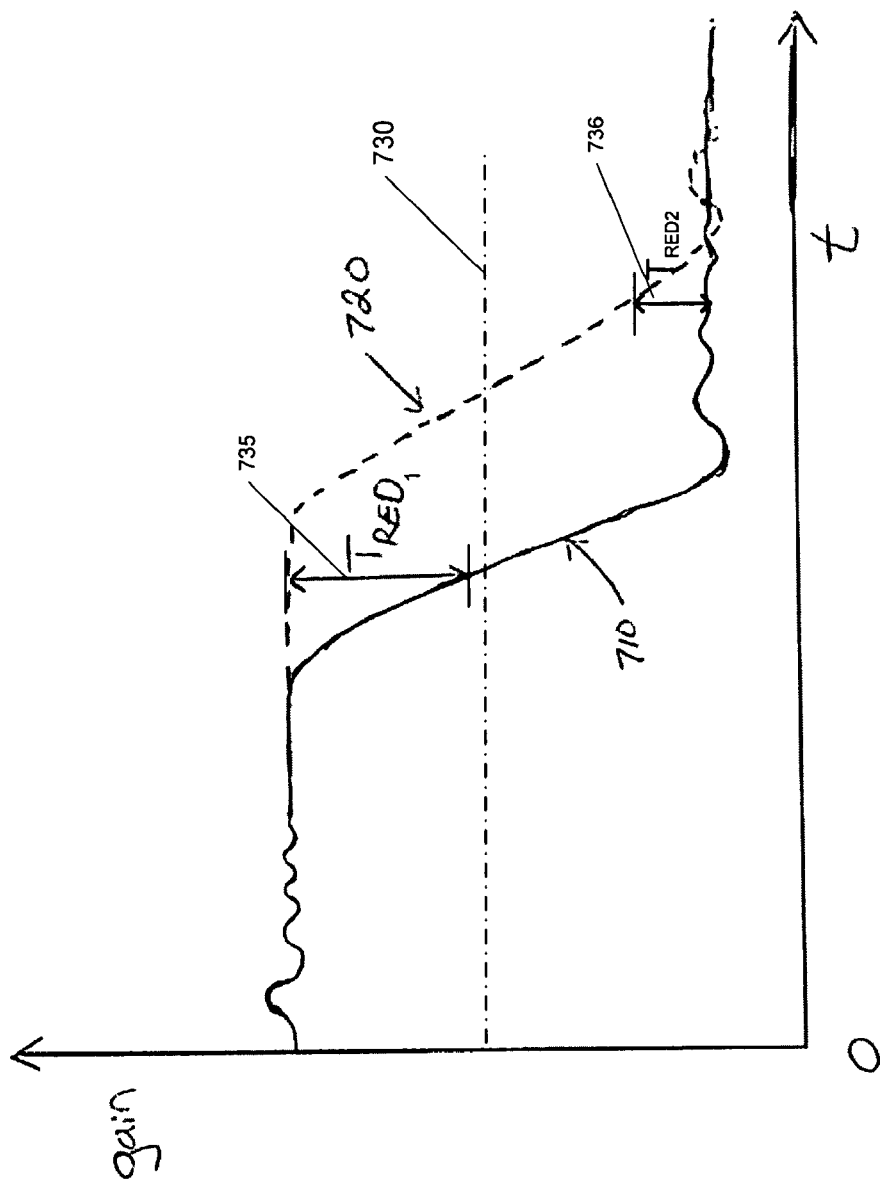
FIG. 7 is a sample plot of gain perceived by the ED unit over time.

If, however, strong noise, is instead detected, the noise floor unit 230 is initially held high due to the AGC 210 unlocking (GAIN_UNLOCK is asserted true). However, if the channel busy signal (CCA) remains idle for a few microseconds while the AGC is still in the unlock state, the AGC 210 of the present embodiment resets the GAIN_UNLOCK signal to false and the noise floor unit 230 begins to track (n curve 720) the falling gain signal E 710 as shown in FIG. 7. Before the noise floor unit 230 completely tracks the noise level, the energy threshold validation signal is temporarily asserted true—from where the difference between the n 720 and E 710 curves exceed the first energy detection threshold $T_{RED1}$ to where it no longer exceeds the second energy detection threshold $T_{RED2}$, as previously discussed. Thus, CCA can still temporarily report a false busy depending on the CCA mode being utilized.

In particular, if 802.11/802.11b CCA mode 1 is supported (ED only) the CCA will report a false busy once the difference between n and E exceed the first energy detection threshold $T_{RED1}$. In the configuration shown in FIG. 2, this will cause the noise floor unit 230 to suspend tracking of the gain signal E. To counteract this, the CCA unit 250, and the comparison unit 1020 in particular, can be used verify that the inbound signal is 802.11/802.11b compliant through preamble or header verification, such as through looking for the presence of the Start Frame Delimiter ("SFD") situated at the end of a proper PLCP frame preamble. If the selected field is found in the correct sequence, e.g. the SFD field is confirmed immediately after the end of the sync symbols, approximately 128 μsec (long preamble format) or 28 μsec (short preamble format) after the signal begins, it may be assumed that the inbound signal is valid, and that CCA unit 250 will report a busy channel for the remaining duration of the packet. If, however, the SFD or other selected field not found at its predesignated place, the inbound signal is presumed invalid and the CCA unit will override the ED mode logic and transition CCA false, indicating that the channel is free and the transceiver 100 may transmit.

Alternatively, if the selected CCA mode also includes carrier sense thresholding (e.g. 802.11/802.11b modes 3 or 5), it is less likely, though still possible, for the CCA unit to still report a false busy, particularly where the carrier sense threshold levels are kept low. Again, SFD or other predefined field verification can be used to clear a false busy a number of microseconds after perception of the inbound signal by the AGC 210 begins.

Though not shown in FIG. 2, an absolute energy thresholding unit may be provided in addition to or as an alternative to the relative energy detection unit 235 to perform routine absolute energy thresholding of the inbound signal.

Referring back to FIG. 2, the frame detection unit 200 also includes the capability of providing carrier sense feedback to the CCA unit 250 through the carrier sense unit 240. This carrier sense unit 240 takes the results of Barker correlation to the inbound signal to verify the presence of a valid DSSS signal. In particular, the Barker correlator 330, in addition to feeding the div2 downconverter 335 and RAKE filter 340, presents the correlation result of the digital form of the inbound baseband signal against the 802.11 Barker PN code to the input of the carrier sense unit 240.

A peak-to-sidelobe ratio determination unit 910 (FIG. 9) examines the real (I) and complex (Q) components of this correlation result to help determine that, in fact, the inbound signal presents a valid Barker modulated preamble or header. In particular, the determination unit 910 calculates a peak-to-sidelobe average ratio as follows:

$$SQ1 = \frac{\max_i(|I_i|+|Q_i|)}{\frac{1}{16}\left(\sum_i |I_i|+|Q_i| - 2\times\max_i(|I_i|+|Q_i|)\right)},$$

where i=half-chip index=0 . . . 21. Or, alternatively:

$$SQ1 = \frac{\max_i(|I_i|+|Q_i|)}{\frac{1}{16}\left(\sum_i (|I_i|+|Q_i|) - 2\times\max_i(|I_i|+|Q_i|) - \sum_k (|I_k|+|Q_k|)\right)},$$

where i, k are half-chip indexes each ranging from 0 . . . 21, where k is the index of four sidelobes relatively distant from a local peak in the received signal. In the latter case, near-peak sidelobes are excluded from the SQ1 computation to counteract potential multipath interference and more effectively validate the inbound signal as being 802.11/802.11b compliant.

In order to better validate the inbound signal as bearing valid Barker modulated information, the carrier sense unit 240 also includes a peak-to-peak detection unit 920 (FIG. 9) to calculate the distance between consecutive peaks in the Barker correlation results provided by the Barker correlator 330. In particular, the consecutive peak-to-peak distance is calculated as follows:

$$pp_n = |\max\_ind_n - \max\_ind_{n-1}|$$

Figure 5:
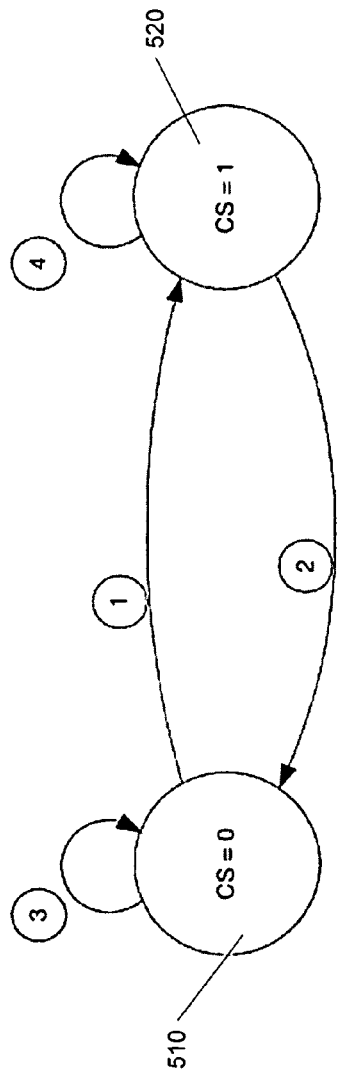
FIG. 5 is a state transition diagram for the CS unit shown in FIG. 2.
Figure 9:
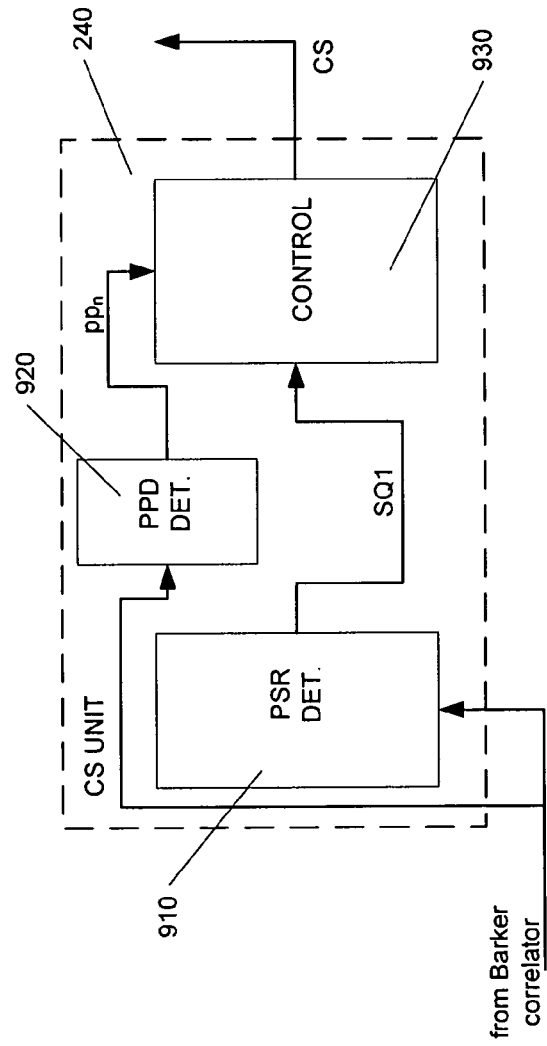
FIG. 9 is a block diagram of the CS unit shown in FIG. 2.

After the peak-to-sidelobe average ratio and the peak-to-peak distance are calculated, their results are thresholded against preferably programmable signal quality thresholds, again based on the current state of the control unit 930 (FIG. 9). As shown in FIG. 5, the control unit 930 of the carrier sense unit 240 functions as a finite state machine capable of switching between two states 510, 520.

Referring to FIG. 5, the control unit 930 of the carrier sense unit 240 is initialized to state 510 at the beginning of each frame detection processing sequence. At state 510, the control unit 930 issues the carrier sense validation signal (CS) as false. While in state 510, the control unit 930 monitors the peak-to-sidelobe average ratio (SQ1) generated by the peak-to-sidelobe determination unit 910 along with the consecutive peak-to-peak distance ($pp_n$) calculated by the peak-to-peak distance determination unit 920 (trans. 3). In this embodiment, if the SQ1 signal meets or exceeds a first signal quality threshold at least 3 out of 4 preceding SQ1 calculation iterations undertaken by the determination unit 910 and the $pp_n$ is less than a maximum acceptable distance in at least 3 out of the 4 preceding $pp_n$ calculation iterations undertaken by the determination unit 920, the control unit 930 transitions to state 520 (trans. 1) and the carrier sense validation signal transitions to logic level 1 or true, thereby indicating that an 802.11/802.11b DSSS signal (e.g. PLCP preamble/header) has been perceived. Note, that in alternative embodiments consistent with the teachings of the present invention, satisfaction of either these SQ1 or $pp_n$ conditions alone and/or setting different threshold criteria for the SQ1 or $pp_n$ may be used to trigger the transition from state 510 to state 520.

Returning to the embodiment shown in FIGS. 5 and 9, the control unit 930 maintains this state (trans. 4) and continues monitor SQ1 and $pp_n$ while asserting the carrier sense validation signal true. If, at state 520, the SQ1 signal meets or exceeds a second signal quality threshold no more than once out of the preceding four calculation iterations undertaken by the determination unit 910, and/or (depending on the desired carrier sense tolerance) the $pp_n$ meets or exceeds the maximum acceptable distance more than once during the preceding 4 calculation iterations undertaken by the determination unit 920, the control unit 930 will transition back to state 510 and the carrier sense validation signal will transition back to false. This can occur in the case of a corrupted PLCP frame preamble or header, or in the case of a valid PLCP frame that has transitioned to the High Rate PPDU. The latter case is expected, and consistent with 802.11 and 802.11b CCA guidelines, the CCA unit 250 will nevertheless report the channel busy until the end of the packet (as indicated by the packet length in the received PLCP frame header) has been reached, and CS is ignored.

Note here that the number of calculation iterations used to assess the SQ1 and $pp_n$ signals in this embodiment is a matter of design choice, and, consistent with the present invention any number of calculation iterations and thresholding may be used as long as a valid symbol-modulated signal can be recognized within relevant CCA tolerances such as those specified in the 802.11/802.11b standards.

Figure 4:
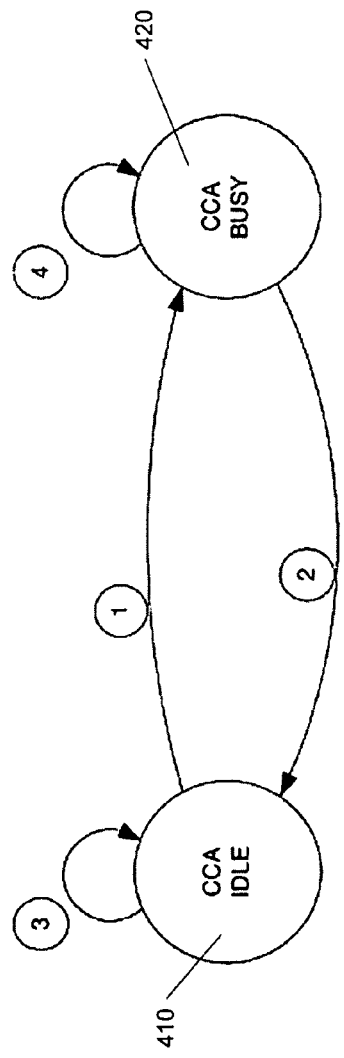
FIG. 4 is a state transition diagram for the CCA unit shown in FIG. 2.
Figure 10:
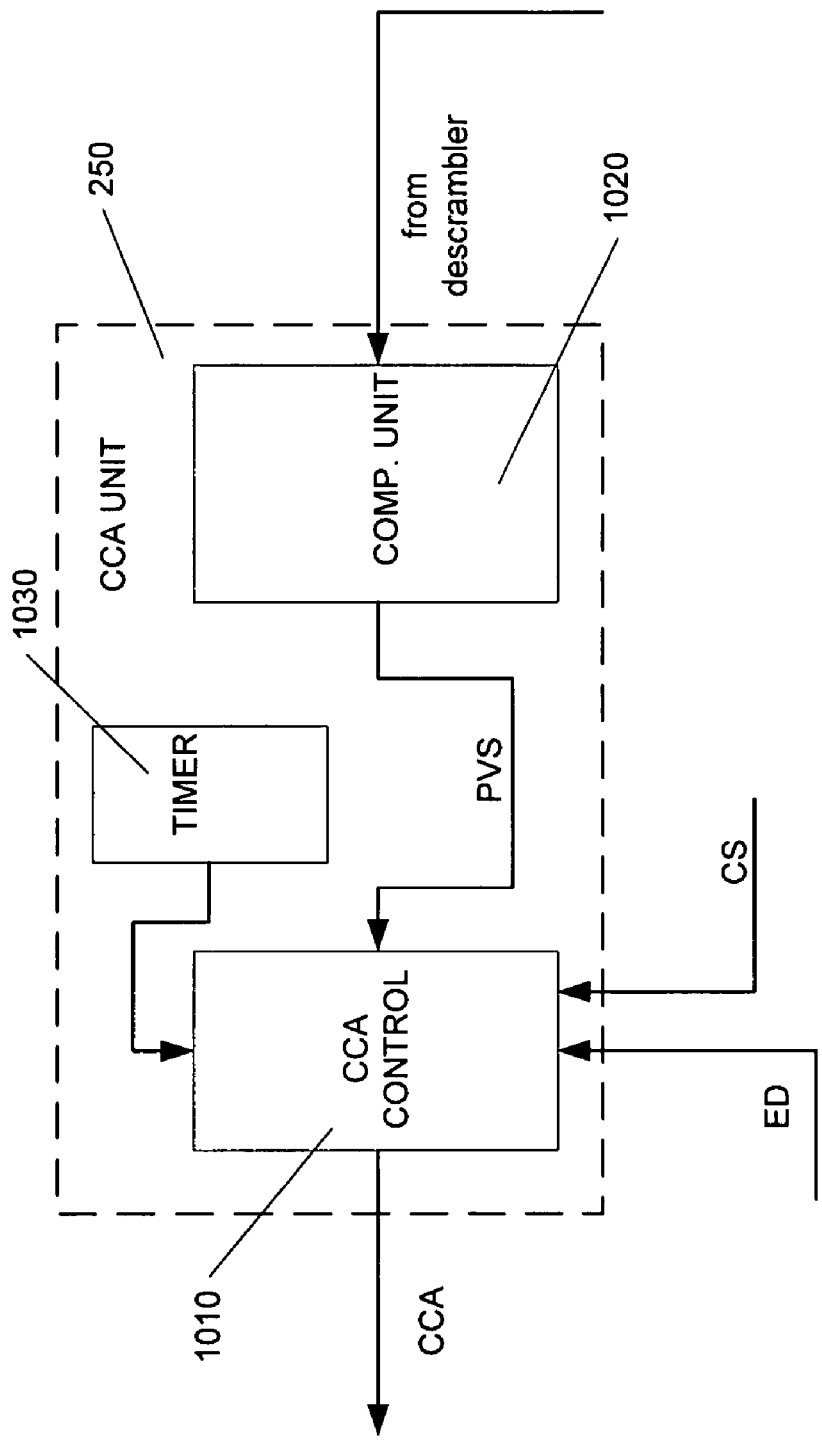
FIG. 10 is a block diagram of the CCA unit shown in FIG. 2.

Returning to FIG. 2, the ED and CS validation signals are sent to the CCA unit 250 of the embodiment shown in FIG. 2 in order to at least assist in determining whether the transceiver 100 should consider the inbound signal as valid. This CCA unit 250 is configured to operate and support at least a subset of the conventional 802.11/802.11b CCA modes 1-5 described above as well as support additional signal validation modes A-E as detailed below. As shown in FIG. 10, the CCA unit includes a control unit 1010 configured as a finite state machine (as depicted in FIG. 4) operating in one of two states 410, 420 based on either the ED and/or CS validation signal semaphores in isolation, or in combination with a PLCP preamble validation to be described below, depending on the desired signal validation mode A-E. In this embodiment, though not required, the CCA control unit 1010 assesses the ED, CS and/or preamble validation signals every microsecond.

The operation of the CCA unit 250, including the CCA control unit 1010 will now be described with reference to the following signal validation modes. State 410 is in the initial state at the beginning of each frame detection processing sequence.

Signal Validation Mode A: ED Only

The ED validation signal is initially assumed to be false. While in state 410 (trans. 3), the CCA control unit 1010 monitors or polls ED, preferably every microsecond. The channel busy signal is held false, indicating that the operating RF channel is free of traffic and is idle. If the ED validation signal transitions to true (logic level 1), The CCA control unit 1010 transitions from state 410 to state 420 (trans. 1), and the channel busy signal transitions to true, indicating that the operating RF channel is considered to be busy with valid traffic. In this embodiment, State 420 is maintained (trans. 4) and the channel busy signal is held true until ED transitions false after the earlier of either antenna selection in a diversity implementation is complete or the CCA timer (default of 12 μsec) expires, the SFD field in the PLCP preamble is not found and the comparison unit 1020 of the CCA unit 250 determines that valid PLCP frame preamble symbols are not being received. The CCA comparison unit 1020 determines this in this embodiment by comparing the output of the descrambler 380 against predetermined preamble data including strings of 8 consecutive 1's or 0's identifiable with the 802.11/802.11b long preamble format or strings of 16 consecutive 1's or 0's identifiable with 802.11b's short preamble format. Consistent with the 802.11/802.11b standards, if the PLCP header is found to be corrupted or the SFD field is omitted, the CCA control unit 1010 will consider the inbound signal as invalid noise and consider the channel to be idle, thus transitioning the control unit 1010 back to step 410. Further, if frame transmission is deemed complete, transition to state 410 will occur.

Though not required, the CCA control unit 1010 can be configured to delay a transition back to state 410 if, for example a recent antenna switch was performed in a receiver selection diversity implementation so as to allow e.g. the AGC 210 to retrain and settle.

Signal Validation Mode B: ED & CS→Busy, ED & CS→Idle

In this mode, the CCA control unit 1010 will transition from idle state 410 to busy state 420 if both the ED and CS validation signals are concurrently asserted true. In this embodiment, state 420 will be held until both the ED and CS validation signals transition false, the SFD field in the PLCP header is not found and the comparison unit 1020 of the CCA unit 250 determines that valid PLCP frame preamble data is not being received. Again, a recent antenna selection in a diversity implementation can forestall, at least temporarily, the transition back to state 410.

Signal Validation Mode C: ED& CS→Busy, ED‖CS→Idle

The operation of the CCA control unit 1010 is similar to that as described for validation mode B previously discussed, but for the 420 to 410 transition requires only that one of the ED and CS validation signals to transition false.

Signal Validation Mode D: ED with Timer

The transition from idle state 410 to busy state 420 occurs similarly to that described previously for signal validation mode A. However, the CCA control unit 1010 remains in busy state 420 with the input validation signal held true unit either the first of an 802.11/802.11b standards compliant 3.65 millisecond timer (e.g. timer 1030 shown in FIG. 10) initiated at the beginning of the frame detection processing sequence times out or the end of the recognized frame is reached.

Signal Validation Mode E: ED & CS with Timer

The transition from idle state 410 to busy state 420 occurs similarly to that described previously for signal validation mode B, and the transition back from busy state 420 to idle state 410 occurs when the first of either the 3.65 millisecond timer expires or the end of the recognized frame is reached.

The above embodiments were described with reference to an 802.11/802.11b PLCP frame format. However, several aspects and features of the present invention are not limited to the particular wireless frame format chosen. For example, since relative energy thresholding according to the present invention is not dependent on the content of the inbound signal, it could be applied to a range of wireless communications which could benefit from clear channel assessment, including, but not limited to, those compliant with one or more of IEEE 802.11a, IEEE 802.16a, and the forthcoming IEEE 802.11g High Rate PHY supplement to the 802.11 standards.

Moreover, carrier sense determination according to the present invention, though dependent on the type of modulation used, can accommodate a wide range of orthogonal class modulated communications, including, but not limited to, the aforementioned Barker modulated communications, CCK modulated communications consistent with 802.11b, and OFDM modulated communications consistent with IEEE 802.11a, IEEE 802.16a, and the forthcoming IEEE 802.11g High Rate PHY supplement to the 802.11 standard.

Figure 3:
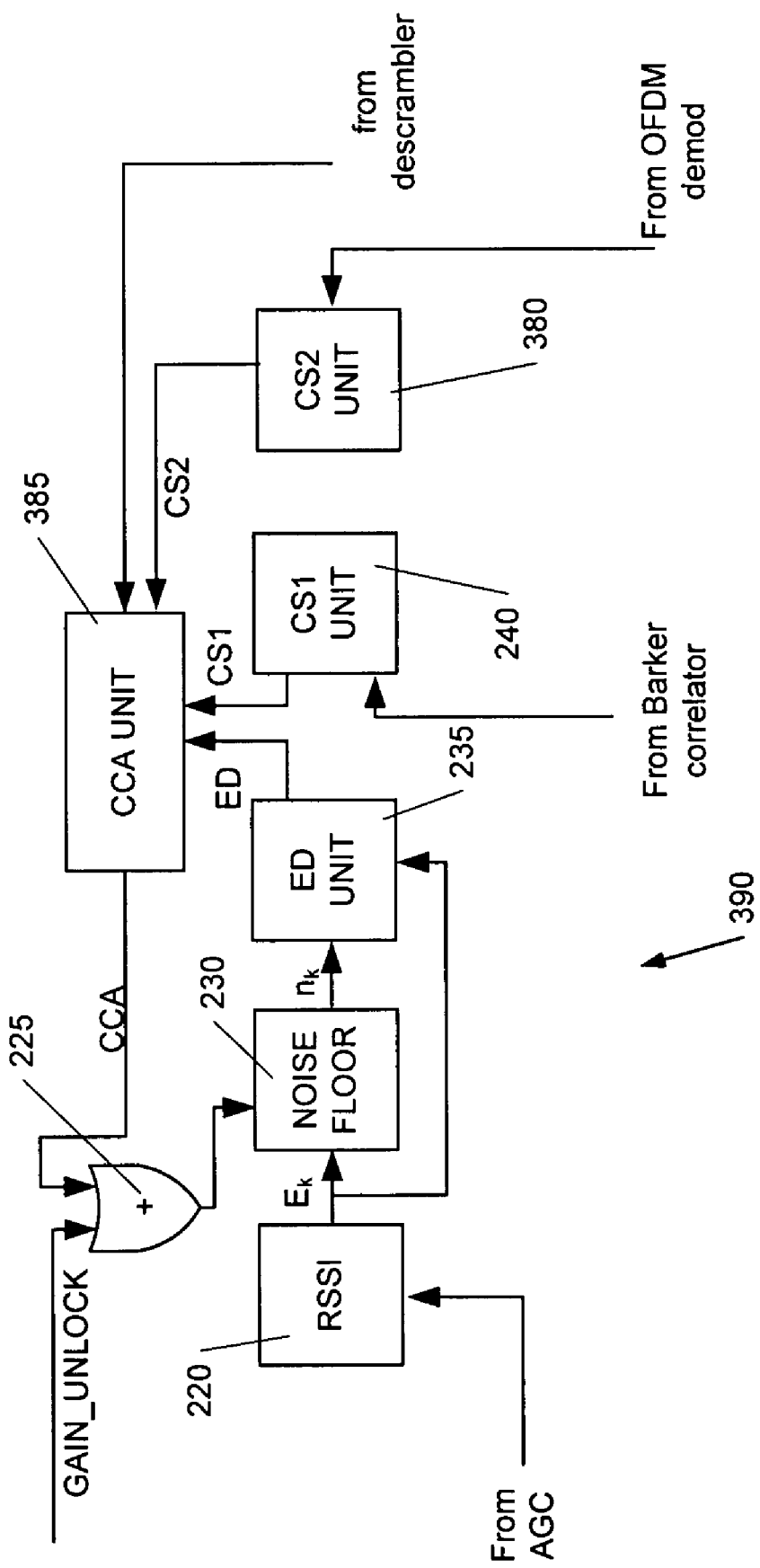
FIG. 3 is a detailed block diagram of a packet detection unit according to an alternative embodiment of the invention.

In the case where the inbound signal may be modulated in one of several ways at the outset, such as proposed in draft IEEE standard 802.11g, a frame detection unit such as that shown in FIG. 3 as frame detection unit 390 may be used which includes plural carrier sense units 240 and 380, to determine the inbound signal bears either Barker or OFDM modulated information. In such case, the CCA unit 385 here may include appropriate processing logic to handle plural carrier sense validation signals (which in this case would have an XOR relationship).

Moreover, while the above described embodiments describe certain componentry in terms of function and functional relationships, it should be realized that such functions and relationships can be conveniently implemented using a wide variety of discrete circuitry and logic, in combination with or alternatively through one or more general purpose or specific purpose information processors such as a microprocessor or digital signal processor programmed in accordance with these functions and relationships, as will be appreciated by those of ordinary skill in the art.

It will be obvious to those having skill in the art that many changes may be made to the details of the above-described embodiments of this invention without departing from the underlying principles thereof. The scope of the present invention should, therefore, be determined only by the following claims.

What is claimed is:

1. A packet detection unit comprising:
    a relative energy detection unit configured to selectively issue an energy threshold validation signal based on a relative energy threshold for an inbound radio frequency (RF) signal;
    a carrier sense unit configured to selectively issue a carrier sense validation signal based on the inbound RF signal, wherein the carrier sense unit generates the carrier sense validation signal based on at least one of a peak-to-sidelobe average ratio or a consecutive peak-to-peak distance, the peak-to-sidelobe average ratio and the consecutive peak-to-peak distance being defined by the inbound RF signal; and
    a clear channel assessment unit configured to selectively issue a channel busy signal based on (i) the carrier sense validation signal and (ii) the energy threshold validation signal, the channel busy signal indicating that the inbound RF signal is valid.

2. The packet detection unit of claim 1, further comprising a comparison unit configured to selectively issue a preamble validation signal based on a comparison between (i) demodulated data and (ii) predetermined preamble data,
    wherein the demodulated data and the predetermined preamble data are generated based on the inbound RF signal.

3. The packet detection unit of claim 2, wherein the channel busy signal is further based on the preamble validation signal.

4. The packet detection unit of claim 1, wherein the carrier sense validation signal comprises a first carrier sense validation signal and a second carrier sense validation signal, and
    wherein the carrier sense unit comprises:
        a peak-to-sidelobe determination unit configured to calculate the peak-to-sidelobe average ratio for the inbound RF signal; and
        a control unit configured to (i) issue the first carrier sense validation signal when the peak-to-sidelobe average ratio is greater than a first signal quality threshold and (ii) issue the second carrier sense validation signal when the peak-to-sidelobe average ratio is less than a second signal quality threshold.

5. The packet detection unit of claim 4, wherein the second signal quality threshold does not exceed the first signal quality threshold.

6. The packet detection unit of claim 4, wherein:
    the carrier sense unit further comprises a consecutive peak-to-peak distance determination unit configured to calculate the consecutive peak-to-peak distance for the inbound RF signal; and
    the control unit is configured to issue the first carrier sense validation signal when (i) the consecutive peak-to-peak distance is less than a predetermined distance and (ii) the peak-to-sidelobe average ratio is greater than the first signal quality threshold.

7. The packet detection unit of claim 4, wherein the energy threshold validation signal comprises first and second energy threshold validation signals, and
    wherein the relative energy detection unit comprises:
        a gain differential unit configured to determine a gain change over time for the inbound RF signal; and
        a second control unit configured to (i) issue the first energy threshold validation signal when the gain change over time exceeds a first energy detection threshold and (ii) issue the second energy threshold validation signal when the gain change over time is less than a second energy detection threshold.

8. The packet detection unit of claim 7, wherein the clear channel assessment unit is configured to issue a channel idle signal based on at least one of the second energy threshold validation signal or the second carrier sense validation signal.

9. The packet detection unit of claim 8, wherein the clear channel assessment unit comprises:
a timer configured to issue a timeout signal after a predetermined time period; and
a control unit configured to selectively issue the channel idle signal based on (i) the timeout signal and (ii) at least one of the second energy threshold validation signal or the second carrier sense validation signal.

10. The packet detection unit of claim 1, wherein the carrier sense validation signal comprises first and second carrier sense validation signals, and
wherein the carrier sense unit comprises:
a consecutive peak-to-peak distance determination unit configured to calculate the consecutive peak-to-peak distance for the inbound RF signal; and
a control unit configured to (i) issue the first carrier sense validation signal when the consecutive peak-to-peak distance is less than a predetermined distance and (ii) issue the second carrier sense validation signal when the consecutive peak-to-peak distance is greater than the predetermined distance.

11. The packet detection unit of claim 10, wherein the energy threshold validation signal comprises first and second energy threshold validation signals, and
wherein the relative energy detection unit comprises:
a gain differential unit configured to determine a gain change over time for the inbound RF signal; and
a second control unit configured to (i) issue the first energy threshold validation signal when the gain change over time is greater than a first energy detection threshold and (ii) issue the second energy threshold validation signal when the gain change over time is less than a second energy detection threshold.

12. The packet detection unit of claim 11, wherein the clear channel assessment unit is configured to issue a channel idle signal based on at least one of the second energy threshold validation signal or the second carrier sense validation signal.

13. The packet detection unit of claim 12, wherein the clear channel assessment unit comprises:
a timer configured to issue a timeout signal after a predetermined time period; and
a control unit configured to selectively issue the channel idle signal based on (i) the timeout signal and (ii) at least one of the second energy threshold validation signal or the second carrier sense validation signal.

14. A packet detection unit comprising:
a comparison unit configured to
receive demodulated data corresponding to an inbound radio frequency (RF) signal, and
selectively issue a preamble validation signal based on a comparison between (i) the demodulated data and (ii) predetermined preamble data;
a carrier sense unit configured to selectively issue a carrier sense validation signal based on the inbound RF signal,
wherein the carrier sense validation signal is generated based on at least one of a peak-to-sidelobe average ratio or a consecutive peak-to-peak distance, the peak-to-sidelobe average ratio and the consecutive peak-to-peak distance being defined by the inbound RF signal; and
a clear channel assessment unit configured to selectively issue a channel busy signal based on (i) the carrier sense validation signal and (ii) the preamble validation signal, the channel busy signal indicating that the inbound RF signal is valid.

15. The packet detection unit of claim 14, further comprising a relative energy detection unit configured to selectively issue an energy threshold validation signal based on a relative energy threshold for the inbound RF signal.

16. The packet detection unit of claim 15, wherein the clear channel assessment unit is configured to selectively issue the channel busy signal further based on the energy threshold validation signal.

17. The packet detection unit of claim 14, wherein the carrier sense validation signal comprises a first carrier sense validation signal and a second carrier sense validation signal, and
wherein the carrier sense unit comprises:
a peak-to-sidelobe determination unit configured to calculate the peak-to-sidelobe average ratio for the inbound RF signal; and
a control unit configured to (i) issue the first carrier sense validation signal when the peak-to-sidelobe average ratio is greater than a first signal quality threshold and (ii) issue the second carrier sense validation signal when the peak-to-sidelobe average ratio is less than a second signal quality threshold.

18. The packet detection unit of claim 17, wherein:
the carrier sense unit further comprises a consecutive peak-to-peak distance determination unit configured to calculate the consecutive peak-to-peak distance for the inbound RF signal; and
the control unit is configured to issue the first carrier sense validation signal when (i) the consecutive peak-to-peak distance is less than a predetermined distance and (ii) the peak-to-sidelobe average ratio is greater than the first signal quality threshold.

19. The packet detection unit of claim 17, wherein the energy threshold validation signal comprises a first energy threshold validation signal and a second energy threshold validation signal, and
wherein the relative energy detection unit comprises:
a gain differential unit configured to determine a gain change over time for the inbound RF signal; and
a second control unit configured to (i) issue the first energy threshold validation signal when the gain change over time exceeds a first energy detection threshold and (ii) issue the second energy threshold validation signal when the gain change over time is less than a second energy detection threshold.

20. The packet detection unit of claim 19, wherein the clear channel assessment unit is configured to issue a channel idle signal based on at least one of the second energy threshold validation signal or the second carrier sense validation signal.

21. The packet detection unit of claim 20, wherein the clear channel assessment unit comprises:
a timer configured to issue a timeout signal after a predetermined time period; and
a control unit configured to selectively issue the channel idle signal based on (i) the timeout signal and (ii) at least one of the second energy threshold validation signal or the second carrier sense validation signal.

22. The packet detection unit of claim 15, wherein the carrier sense validation signal comprises first and second carrier sense validation signals, and
wherein the carrier sense unit comprises:
a consecutive peak-to-peak distance determination unit configured to calculate the consecutive peak-to-peak distance for the inbound RF signal; and a control unit configured to (i) issue the first carrier sense validation signal when the consecutive peak-to-peak distance is less than a predetermined distance and (ii) issue the second carrier sense validation signal when the consecutive peak-to-peak distance is greater than the predetermined distance.

23. The packet detection unit of claim 22, wherein the energy threshold validation signal comprises a first energy threshold validation signal and a second energy threshold validation signal, and wherein the relative energy detection unit comprises:
a gain differential unit configured to determine a gain change over time for the inbound RF signal; and
a second control unit configured to (i) issue the first energy threshold validation signal when the gain change over time is greater than a first energy detection threshold and (ii) issue the second energy threshold validation signal when the gain change over time is less than a second energy detection threshold.

24. A packet detection unit comprising:
a relative energy detection unit configured to selectively issue an energy threshold validation signal based on a relative energy threshold for an inbound radio frequency (RF) signal;
a carrier sense unit configured to selectively issue a carrier sense validation signal based on the inbound RF signal;
wherein the carrier sense unit generates the carrier sense validation signal based on at least one ala peak-to-sidelobe average ratio or a consecutive peak-to-peak distance, the peak-to-sidelobe average ratio and the consecutive peak-to-peak distance being defined by the inbound RF signal;
and a clear channel assessment unit configured to selectively issue a channel busy signal based on the earner sense validation signal or the energy threshold validation signal, the channel busy signal indicating that the inbound RE signal is valid,
wherein said carrier sense unit issues the carrier sense validation signal based on whether the inbound RF signal includes at least one of a valid direct sequence spread spectrum (DSSS) signal or a valid Barker modulated header.

25. The packet detection unit of claim 24, wherein said carrier sense unit is configured to issue the carrier sense validation signal based on whether the inbound RF signal includes the valid DSSS signal and the valid Barker modulated header.

* * * * *